United States Patent

[11] 3,613,061

| [72] | Inventor | Bryant D. Lund<br>1955 Hollywood Ave., Salt Lake City, Utah 84108 |
|---|---|---|
| [21] | Appl. No. | 756,201 |
| [22] | Filed | Aug. 29, 1968 |
| [45] | Patented | Oct. 12, 1971 |

[54] PRESSURE-RESPONSIVE, TIMED, ELECTRONIC CONTROL APPARATUS AND METHODS
1 Claim, 3 Drawing Figs.

[52] U.S. Cl. .................................................. 340/221,
340/10, 340/15, 340/261
[51] Int. Cl. .................................................. G08b 1/00
[50] Field of Search .......................................... 340/15, 10, 261, 221

[56] References Cited
UNITED STATES PATENTS

| 2,942,247 | 6/1960 | Lienau et al. .................. | 340/15 |
|---|---|---|---|
| 2,988,728 | 6/1961 | Marlow ........................ | 340/10 |
| 3,138,778 | 6/1964 | Dulin ........................... | 340/261 |
| 3,258,762 | 6/1966 | Donner ........................ | 340/261 |
| 2,186,922 | 1/1940 | Hampton et al. .............. | 340/38 |
| 2,347,194 | 4/1944 | Holliday ....................... | 340/38 |
| 3,261,009 | 7/1966 | Stetten et al. ................. | 340/15.5 |
| 3,346,842 | 10/1967 | Dixon .......................... | 340/38 |

*Primary Examiner*—Rodney D. Bennett, Jr.
*Assistant Examiner*—Joseph G. Baxter
*Attorney*—C. Harvey Gold ABSTRACT: A control apparatus which includes a piezoelectric converter embedded in a pressure-carrying medium, which is electrically connected to an electronic amplifier for amplifying the voltage output of the converter. A switching circuit is electrically connected to the amplifier for activating a switch which controls the operation of a motion-picture camera when the output voltage of the converter is at a predetermined level. A second circuit is electrically connected to the switching circuit for maintaining the switch closed and opened for predetermined times.

PATENTED OCT 12 1971        3,613,061

INVENTOR.
BRYANT D. LUND

BY
C. Harvey Gold
HIS ATTORNEY

PRESSURE-RESPONSIVE, TIMED, ELECTRONIC CONTROL APPARATUS AND METHODS

BACKGROUND OF THE INVENTION

This invention relates to an electronic pressure-sensitive control apparatus.

It is often desirable to activate a motion-picture camera in response to predetermined pressure changes such as those caused by sound waves and the like. For example, it is desirable to photograph wild animals in their natural habitat. However, as might be expected, if the presence of an individual is required to activate the camera, the animal to be photographed is often frightened away before it moves into camera range. For this reason a need has arisen for an inanimate control device to activate the camera whenever an animal or other subject approaches the control device. It is generally desirable to program the control device to maintain the camera activated for a predetermined period and also prevent the camera from operating for a predetermined interval after an activation period. For example, it is desirable to run the camera for a few seconds and then deactivate it for a predetermined interval even though the control device senses the presence of a subject to be photographed.

SUMMARY OF THE INVENTION

This invention provides a control apparatus, activated with a piezoelectric converter, particularly adapted for activating independently powered motion-picture cameras.

In its broadest form, the invention comprises a piezoelectric material converter embedded in a pressure-carrying medium; amplifier means electrically connected to the converter for amplifying the voltage output produced by said converter; switching circuit means electrically connected to said amplifier means for activating a switch which controls a motion-picture camera when the output voltage of said converter member is at a predetermined level; and second circuit means electrically connected to said switching circuit means for maintaining said control switch closed and opened for predetermined times.

BRIEF DESCRIPTION OF THE DRAWINGS

So that the invention may be more readily understood and carried into effect, reference is made to the accompanying drawings which are offered by way of example only and are not to be taken as limiting the invention, the scope of which is defined by the appended claims which are intended to embrace equivalent structures.

DESCRIPTION OF THE PREFERRED EMBODIMENT

Figure 1:
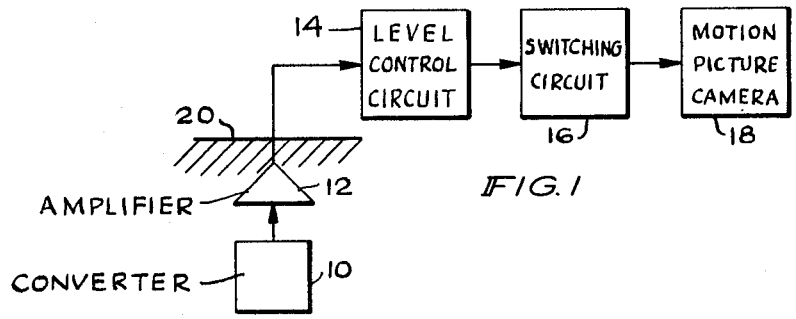
FIG. 1 is a block representation of the control apparatus of this invention.

The activation device of this invention is illustrated in block form in FIG. 1. As shown, piezoelectric material converter 10 embedded in a pressure-carrying medium 20, such as earth, water, air, etc., is connected to an electronic amplifier 12 which amplifies the current produced by the converter when it is stressed by an external pressure placed on the pressure-carrying medium. The amplifier voltage is modified to a predetermined level with voltage level control circuit 14 and this voltage activates switching circuit 16 which in turn controls a motion-picture camera 18. Switching circuit 16 generally performs several functions. Firstly, it activates the camera and maintains it activated for a predetermined time even though no current is produced by the electromechanical converter. In addition, it deactivates the camera after a predetermined operative period for a fixed interval even though the converter 10 is stressed during the deactivation period to produce an activation voltage.

Piezoelectric material electromechanical converters are well-known devices which produce electrical current when subjected to a mechanical stress. One such converter is the crystal type generally referred to as piezoelectric crystals, e.g., quartz, tourmaline, Rochelle salt, and the like. Another piezoelectric converter is the ceramic type, e.g., barium titanite, lead zirconate titanite, etc. Preferably the piezoelectric converter 10 of this invention is a piezoelectric crystal.

Figure 2:
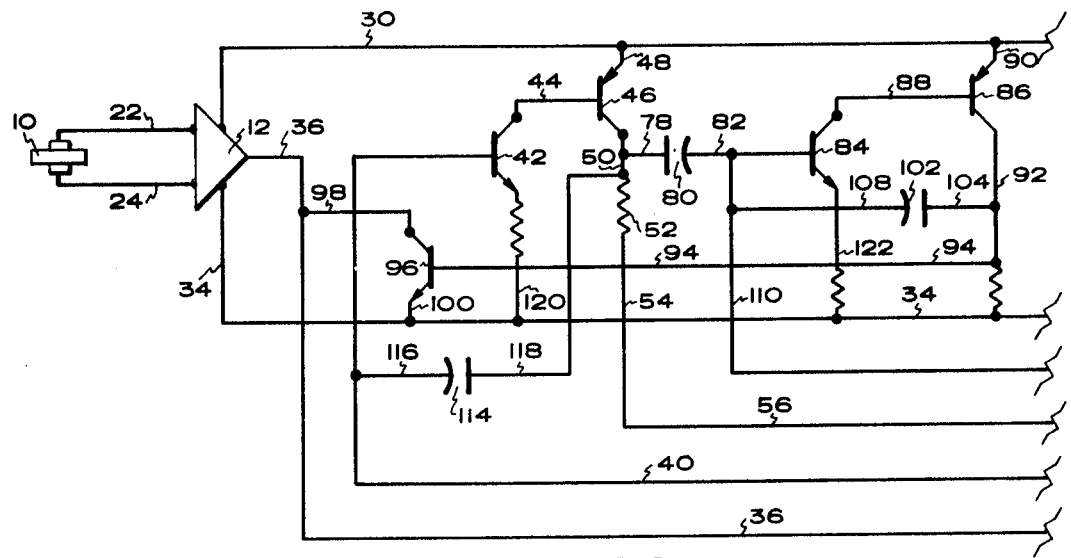
FIG. 2 is a schematic representation of the sensing portion of the control apparatus.
Figure 3:
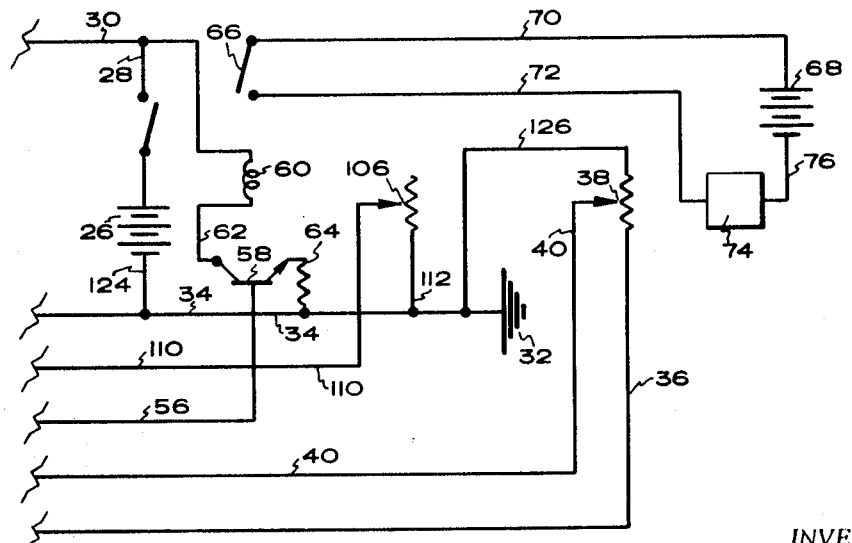
FIG. 3 is a schematic representation of the control portion of the control apparatus of this invention.

Referring now to FIGS. 2 and 3, converter 10 is electrically connected with conductors 22 and 24 to a conventional electronic amplifier 12 so that the current produced by the converter is transmitted to the amplifier for amplification. Amplifier 12 is powered by source 26 which can be a conventional dry cell battery electrically connected to the amplifier with switched line 28 and line 30 and to return 32 with line 34. Current produced by amplifier 12 travels along line 36 to potentiometer 38 where its voltage is modified to a predetermined level.

From potentiometer 38 current flows along line 40 to the base of NPN transistor 42 which is forward biased when the voltage applied to said base reaches a predetermined level. The collector of transistor 42 is electrically connected with line 44 to the base of PNP transistor 46. When transistor 42 is forward biased a low-level voltage is applied to the base of transistor 46 which is sufficient to forward bias the transistor 46 and allow current to flow from lines 30 and 48, through the transistor's emitter and collector, and from thence along line 50, through resistor 52, and along lines 54 and 56 to the base NPN transistor 58 which is then also forward biased.

When transistor 58 is forward biased current flows from source 26, along switched line 28 and the line 30, through coil 60, and from thence along line 62 and through the collector and emitter of transistor 58 to return line 34 along resistored line 64. When current passes through coil 60 control switch 66 is urged to a closed position which allows current to flow from a second power source 68 along lines 70 and 72 to power a drive motor 74 illustrated in FIG. 3. Motor 74 can be used to drive a conventional device such as a motion-picture camera, swimming pool alarms or the like. From motor 74 current travels back to power source 68 along line 76. It is to be noted that motor 74 remains powered as long as the base of transistor 58 is forward biased which allows current to flow through coil 60. In a modified embodiment of the invention, transistor 58 is the only switch used to activate motor 74, thereby eliminating the need for coil 60 and switch 66.

As indicated, it is preferred to maintain motor 74 operative for a predetermined period once it is activated. For this reason line 50 is also connected to the base of transistor 42 for maintaining the transistor forward biased as long as current flows through capacitor 114 connected with line 116 to line 40 and with line 118 to line 50. As long as current can flow through the capacitor 114 a positive charge sufficient to maintain transistor 42 forward biased is applied to the base of the transistor even through the output of amplifier 12 is grounded, or the output from the amplifier is not at the activation level. However, once capacitor 114 has been charged it can no longer transmit current to line 116 and from thence to the base of transistor 42 wherein the transistor is reversed biased and switch 66 is closed.

Current passed through transistor 46 also passes along line 78 to capacitor 80 and from thence along line 82 to the base of NPN transistor 84 which is forward biased. The collector of transistor 84 is connected with line 88 to the base of PNP transistor 86 and when transistor 84 is forward biased said transistor 86 is similarly biased which allows current to flow from line 30, along line 90, through the emitter and collector of transistor 86, and along lines 92 and 94 to the base of NPN transistor 96 which is thereupon also forward biased. When transistor 96 is forward biased the output of amplifier 12 is grounded along lines 36 and 98, through the collector and emitter of transistor 96, and along line 100 to return line 34. When thus grounded the amplifier cannot transmit activation current to transistor 42 even though converter 10 produces voltage pulses normally sufficient to forward bias the transistor 42. Amplifier 12 is grounded for a time interval determined by the capacitance of control capacitor 102 and the resistance of potentiometer 106. Control capacitor 102 is connected to the collector of transistor 86 with lines 92 and 104 and to potentiometer 106 with lines 108 and 110. Potentiometer 106 in turn is connected to return line 34 with conductor 112.

Once capacitor 102 is fully charged it can no longer transmit current to the base of transistor 84 wherein the positive charge is removed from the base of transistor 96 which results in the reverse biasing of said transistor 96 and the ungrounding of the output from amplifier 12 whereupon the circuit is now ready to be reactivated by another voltage pulse from amplifier 12. The time to charge capacitor 102 is preferably longer than the time required to charge capacitor 114 so that switch 66 must of necessity also be opened after each time it is closed for a predetermined interval.

To complete the description of FIGS. 2 and 3, the emitter of transistor 42 is connected through resistored line 120 to return line 34 and the emitter of transistor 84 is connected through resistored line 122 to return line 34. In addition, source 26 is connected with conductor 124 to the return line 34 and potentiometer 38 is connected with line 126 to return 34.

In constructing the activation device of this invention it is generally preferred to form the circuit illustrated in FIG. 2 in one housing which is connected with an interconnecting cable into the control assembly circuit illustrated in FIG. 3 since the control assembly contains a power source which requires periodic changing, potentiometer 38 for adjusting the voltage level required to activate switch 66, and the delay control potentiometer 106. When thus constructed, the pressure-sensing circuit can be buried or otherwise embedded in a pickup medium and left unattended for many years since it should not require servicing. The pressure-sensing circuit can then be connected to the control assembly which in turn is connected to the electronic circuit to be activated. For example, when the control device of this invention is to control a motion-picture camera used to photograph animals in their natural habitat, the pressure-sensing circuit portion of the control device is embedded in a game trail frequented by the animal to be photographed. This device is then connected to the control assembly with an interconnecting cable which is in turn connected to the drive motor motion-picture camera with another interconnecting cable. The circuit can then be adjusted so that the pressure exerted on the pressure-sensing unit by an animal walking on the game trail is sufficient to close switch 66 and activate the camera drive motor. The camera can be left unattended for long periods of time since it will only be activated, and then for short intervals, when an animal walks along the game trail over the pressure-sensing circuit.

Whereas there is here illustrated and specifically described a certain preferred construction which is presently regarded as the best mode of carrying out the invention, it should be understood that various changes can be made and other construction adopted without departing from the inventive subject matter particularly pointed out and claimed.

I claim:

1. A method for activating an unattended motion-picture camera in response to the intrusion of animals of predetermined size into the range of said camera, which comprises:

locating a pressure-sensing circuit, including a piezoelectric material electromechanical converter, in the earth such that it is responsive to pressure changes in the earth caused by animals intruding into said camera range;

connecting said converter through an amplifier and switching circuit means to a control circuit means for activating said motion-picture camera, said control circuit means being adapted to turn on said motion-picture camera for a predetermined time interval in response to closing of said switching circuit means and to then turnoff said camera for a predetermined time interval before it can again be turned on; and adjusting said switching circuit means to close only in response to pressure changes caused by animals of at least said predetermined size.